United States Patent
Konno et al.

(10) Patent No.: US 9,973,659 B2
(45) Date of Patent: May 15, 2018

(54) IMAGING ELEMENT, IMAGE READING DEVICE, IMAGE FORMING APPARATUS, AND IMAGING METHOD

(71) Applicants: Yoshio Konno, Kanagawa (JP); Masamoto Nakazawa, Kanagawa (JP); Hiroki Shirado, Kanagawa (JP)

(72) Inventors: Yoshio Konno, Kanagawa (JP); Masamoto Nakazawa, Kanagawa (JP); Hiroki Shirado, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/191,035

(22) Filed: Jun. 23, 2016

(65) Prior Publication Data

US 2017/0019567 A1 Jan. 19, 2017

(30) Foreign Application Priority Data

Jul. 13, 2015 (JP) .................. 2015-139991
Mar. 10, 2016 (JP) .................. 2016-047580

(51) Int. Cl.
*H04N 1/04* (2006.01)
*H04N 1/40* (2006.01)
(Continued)

(52) U.S. Cl.
CPC ........... *H04N 1/58* (2013.01); *H04N 1/02805* (2013.01); *H04N 1/401* (2013.01); *H04N 5/361* (2013.01);
(Continued)

(58) Field of Classification Search
CPC ...... H04N 1/58; H04N 1/02805; H04N 1/401; H04N 5/361; H04N 5/363
(Continued)

(56) References Cited

U.S. PATENT DOCUMENTS

2006/0022862 A1    2/2006  Egawa et al.
2007/0188638 A1    8/2007  Nakazawa et al.
(Continued)

FOREIGN PATENT DOCUMENTS

JP    2005-341278    12/2005
JP    4481758    3/2010
(Continued)

OTHER PUBLICATIONS

U.S. Appl. No. 14/988,802, filed Jan. 6, 2016.

*Primary Examiner* — Cheukfan Lee
(74) *Attorney, Agent, or Firm* — Oblon, McClelland, Maier & Neustadt, L.L.P.

(57) ABSTRACT

An imaging element includes: a plurality of pixel units configured to each include a plurality of light receiving elements performing photoelectric conversion; a plurality of analog-to-digital (A/D) converters configured to be provided to each of the pixel units for sequentially converting an analog signal obtained by photoelectric conversion performed by the light receiving elements to a digital signal; a plurality of first holding units configured to be provided to each of the pixel units for sequentially holding a digital signal obtained by conversion performed by the A/D converters; and a plurality of second holding units configured to receive and hold a digital signal held by the first holding units in a period when the A/D converters do not convert an analog signal to a digital signal.

14 Claims, 9 Drawing Sheets

(51) Int. Cl.
*H04N 1/58* (2006.01)
*H04N 1/028* (2006.01)
*H04N 5/363* (2011.01)
*H04N 5/378* (2011.01)
*H04N 5/361* (2011.01)
*H04N 5/369* (2011.01)
*H04N 1/401* (2006.01)

(52) U.S. Cl.
CPC .......... *H04N 5/363* (2013.01); *H04N 5/3692* (2013.01); *H04N 5/378* (2013.01); *H04N 2201/0081* (2013.01); *H04N 2201/0094* (2013.01)

(58) Field of Classification Search
USPC ...... 358/513, 514, 483, 482, 445; 250/208.1
See application file for complete search history.

(56) References Cited

U.S. PATENT DOCUMENTS

| | | |
|---|---|---|
| 2008/0252787 A1 | 10/2008 | Nakazawa et al. |
| 2009/0152446 A1* | 6/2009 | Mizuno .................... G01J 1/46 250/214 R |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2012/0008173 A1 | 1/2012 | Konno et al. |
| 2012/0057211 A1 | 3/2012 | Shirado |
| 2012/0092732 A1 | 4/2012 | Nakazawa |
| 2012/0224205 A1 | 9/2012 | Nakazawa |
| 2013/0063792 A1 | 3/2013 | Nakazawa |
| 2014/0029065 A1 | 1/2014 | Nakazawa |
| 2014/0043629 A1 | 2/2014 | Shirado |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0049232 A1* | 2/2015 | Kim ...................... H04N 5/378 348/308 |
| 2015/0077611 A1 | 3/2015 | Yamashita et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0163403 A1* | 6/2015 | Wakabayashi ......... H04N 5/378 348/308 |
| 2015/0189209 A1* | 7/2015 | Yang ..................... H04N 5/378 348/300 |
| 2015/0222790 A1 | 8/2015 | Asaba et al. |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0088179 A1 | 3/2016 | Nakazawa et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |

FOREIGN PATENT DOCUMENTS

| | | |
|---|---|---|
| JP | 2014-138406 | 7/2014 |
| JP | 2015-056878 | 3/2015 |

* cited by examiner

IMAGING ELEMENT, IMAGE READING DEVICE, IMAGE FORMING APPARATUS, AND IMAGING METHOD

CROSS-REFERENCE TO RELATED APPLICATION

The present application claims priority under 35 U.S.C. § 119 to Japanese Patent Application No. 2015-139991, filed Jul. 13, 2015 and Japanese Patent Application No. 2016-047580, filed Mar. 10, 2016. The contents of which are incorporated herein by reference in their entirety.

BACKGROUND OF THE INVENTION

1. Field of the Invention

The present invention relates to an imaging element, an image reading device, an image forming apparatus, and an imaging method.

2. Description of the Related Art

In complementary metal-oxide semiconductor (CMOS) image sensors, there has been known the one that performs analog signal processing and digital signal processing in a chip so as to receive light, convert the received light to an analog signal, and further convert the analog signal to a digital signal. In this case, noise generated in a digital circuit may be superimposed on an analog signal, thereby degrading an image signal.

Japanese Patent No. 4481758 discloses a signal processor that outputs a signal stored in a line memory in a period other than a noise canceling period in a horizontal scanning period through an output circuit and control the line memory so that logic noise in a digital signal processing circuit and output noise at an output terminal are not generated in the one horizontal noise canceling period.

In the conventional technique, outputting a signal in a period other than a noise canceling period through an output circuit reduces mixture of noise into the signal; however, the signal cannot be prevented from being degraded due to noise generated at other timings.

SUMMARY OF THE INVENTION

According to one aspect of the present invention, there is provided an imaging element including: a plurality of pixel units configured to each include a plurality of light receiving elements performing photoelectric conversion; a plurality of analog-to-digital (A/D) converters configured to be provided to each of the pixel units for sequentially converting an analog signal obtained by photoelectric conversion performed by the light receiving elements to a digital signal; a plurality of first holding units configured to be provided to each of the pixel units for sequentially holding a digital signal obtained by conversion performed by the A/D converters; and a plurality of second holding units configured to receive and hold a digital signal held by the first holding units in a period when the A/D converters do not convert an analog signal to a digital signal.
an imaging element including: a pixel unit configured to include a plurality of light receiving elements performing photoelectric conversion; an analog-to-digital (A/D) converter configured to sequentially convert an analog signal obtained by photoelectric conversion performed by the plurality of light receiving elements to a digital signal; a first holding unit configured to sequentially hold the digital signal obtained by conversion performed by the A/D converter; and a second holding unit configured to receive and hold the digital signal held by the first holding unit in a period when the A/D converter does not convert the analog signal to the digital signal.

According to another aspect of the present invention, there is provided an imaging method including: sequentially converting an analog signal obtained by photoelectric conversion performed by a plurality of light receiving elements to a digital signal for each pixel unit including a predetermined number of light receiving elements; sequentially holding each of the converted digital signals in a plurality of first holding units for each the pixel unit; and transferring, after analog signals are converted to digital signals for each pixel unit, a plurality of digital signals held by the first holding units to a plurality of second holding units for each the first holding unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
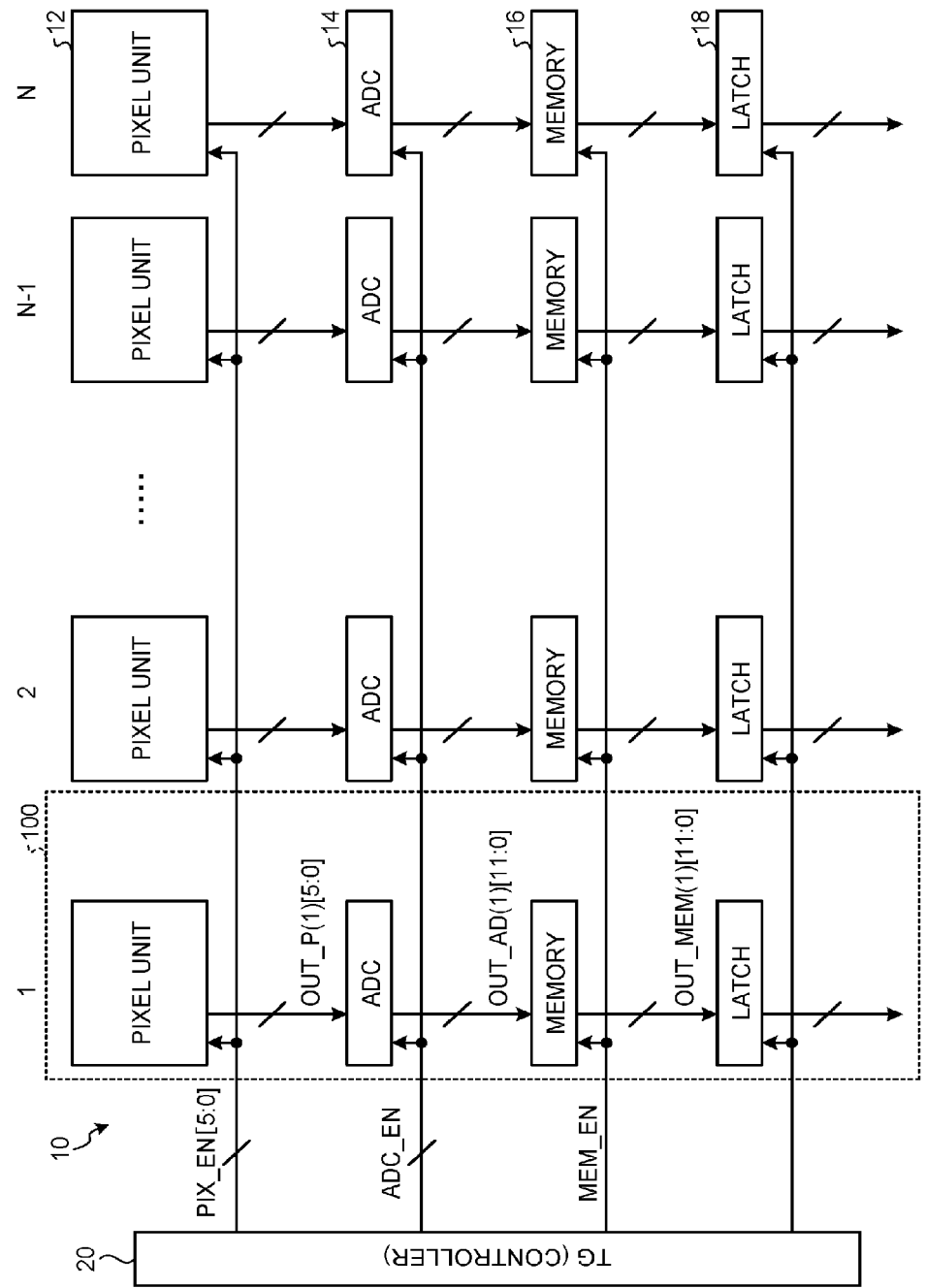
FIG. 1 is a view illustrating the outline of an imaging element in accordance with a first embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

The present invention has an object to provide an imaging element, an image reading device, an image forming apparatus, and an imaging method that are capable of preventing noise generated in a digital signal at a timing other than the timing when a signal is output to an external unit at a post stage from being mixed into an analog signal.

The following describes an imaging element according to a first embodiment with reference to the accompanying drawings. FIG. 1 is a view illustrating the outline of an imaging element 10 in accordance with the first embodiment. The imaging element 10 is a complementary metal-oxide semiconductor (CMOS) linear sensor that includes, for example, N each of pixel units 12, analog-to-digital converters (ADCs) 14, memories 16, and latches 18, and a timing controller (timing generator (TG)) 20 controlling the operation timing of the above-mentioned units.

Each of the pixel units 12 is a pixel group that includes six light receiving elements (photodiodes (PDs)) in total performing photoelectric conversion on, for example, two each (two pixels) of red (R) pixels, green (G) pixels, and black (B) pixels. The pixel units 12 convert electric charge of each light receiving element to a voltage signal, and include an analog memory for holding the converted voltage and a pixel circuit such as a reset circuit. Depending on a signal (PIX_EN[5:0]) input from the timing controller 20, the pixel units 12 sequentially output electric charge generated by each of the six light receiving elements depending on the amount of incident light as an analog signal for six pixels OUT_P[5:0] to the ADCs 14. In addition, the pixel units 12 can sequentially output an analog signal indicating the reference level of each of the six light receiving elements in darkness as a signal for six pixels to the ADCs 14.

Each of the ADCs 14 is an analog-to-digital (A/D) converter that sequentially converts, depending on a signal (ADC_EN) input from the timing controller 20, an analog signal indicating the reference level in darkness input from the pixel unit 12 and an analog signal indicating the signal level in receiving light to digital signals. The ADCs 14 output a digital signal as OUT_AD[11:0].

Each of the memories 16 is a first holding unit that can sequentially hold a digital signal output by the ADC 14. The memories 16 output a digital signal as OUT_MEM[11:0].

Each of the latches 18 is a second holding unit that receives and holds a plurality of digital signals OUT_MEM [11:0] held by the memory 16. After the ADCs 14 convert an analog signal to a digital signal for each pixel unit 12, the latches 18 receive and hold a plurality of digital signals held by the memories 16, as described later.

In the imaging element 10, each one of the pixel units 12, the ADCs 14, the memories 16, and the latches 18 forms one column 100. In other words, the imaging element 10 is a CMOS linear sensor that includes N (one to N) column(s) 100. The value of N is, for example, 3,750. In this case, the imaging element 10 is a CMOS linear color image sensor that includes light receiving elements of 7,500 each of R pixels, G pixels, and B pixels, and, when the imaging element 10 is applied to an image reading device, the light receiving elements are arranged in a main-scanning direction for each color in order to read, for example, an A3 document size.

In the imaging element 10, the timing controller 20 controls the transfer of a digital signal from the memories 16 to the latches 18 in a period when the ADCs 14 do not convert an analog signal to a digital signal. In other words, in the imaging element 10, a period when analog signal is processed is not overlapped with a period when data is transferred.

Figure 2:
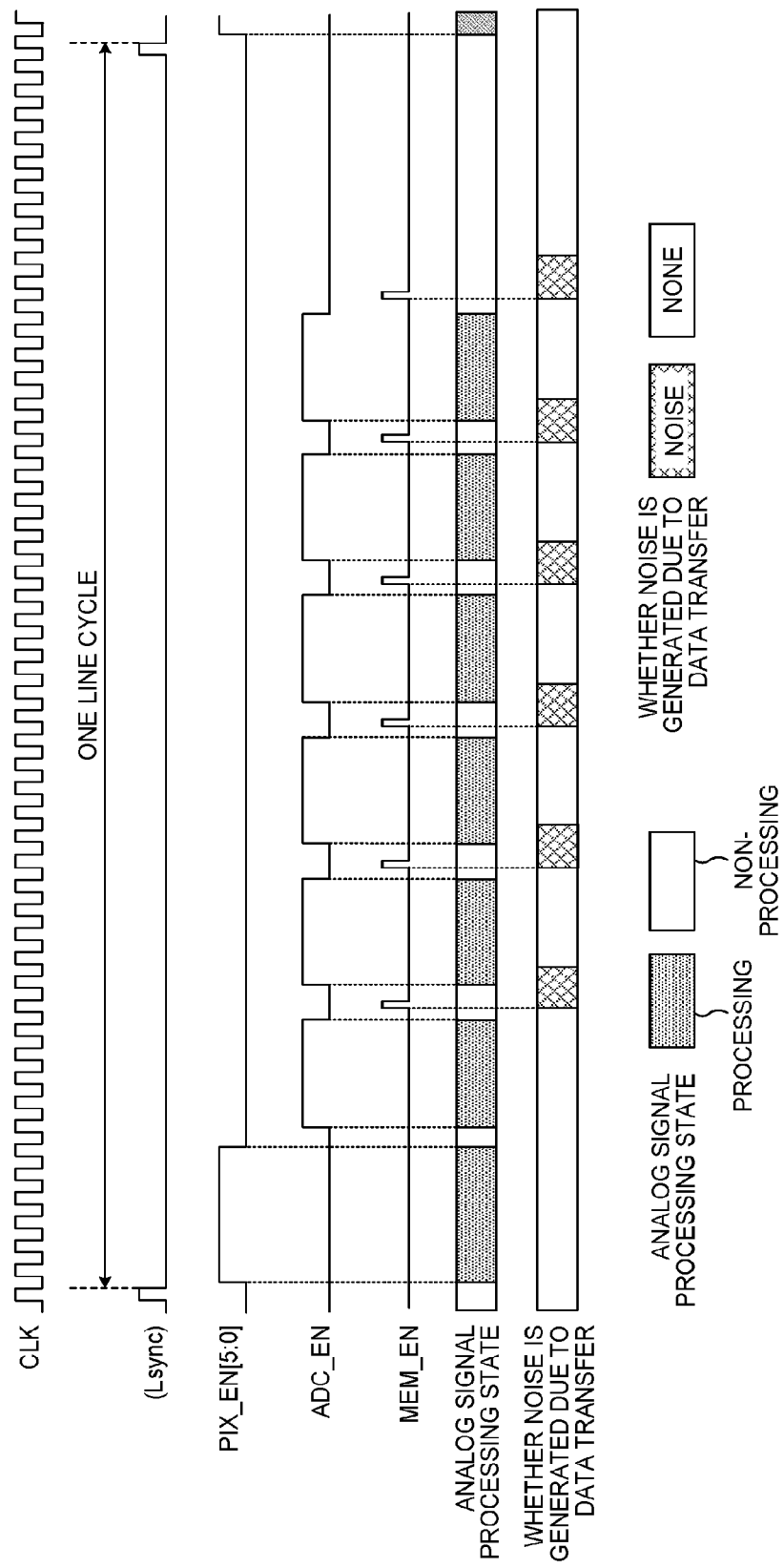
FIG. 2 is a timing chart illustrating an operation example as a comparative example of the imaging element.

FIG. 2 is a timing chart illustrating an operation example as a comparative example of the imaging element 10. FIG. 2 illustrates an operation timing when the one column 100 receives light. In other words, in the imaging element 10, all columns 100 (for example, 3,750 columns) simultaneously perform operation as a whole.

In the imaging element 10, the timing controller 20 generates each drive signal using a reference clock (CLK) as a reference. An Lsync is a line synchronization signal, and indicates a cycle for one line of image data in the main-scanning direction. The light receiving elements (PDs) in each of the pixel units 12 store therein electric charge depending on the strength of an incident light amount. The pixel units 12 hold, in internal analog memories, each analog signal to which electric charge-voltage conversion has been applied in the execution period of PIX_EN[5:0] input from the timing controller 20.

The ADCs 14 sequentially read an analog signal for two each of R pixels, G pixels, and B pixels held by the pixel units 12 and apply A/D conversion to the analog signal in the execution period of a signal (ADC_EN) input from the timing controller 20. The ADCs 14 sequentially output a digital signal determined by the A/D conversion, for example, every one bit (for example, in the case of cyclic A/D conversion).

The memories 16 sequentially hold a digital signal output by the ADCs 14. When A/D conversion of a digital signal is completed, the digital signal is transferred from the memories 16 to the latches 18 in the execution period of MEM_EN.

Transferred data from the memory 16 to the latch 18 is image data of 12 bits. Because data is simultaneously transferred from the memory 16 to the latch 18 in each of the columns 100 (N=3,750), processing in the imaging element 10 has a high load. In other words, a load of the data transfer from the ADCs 14 to the memories 16 is one bit each, whereas a load of the data transfer from the memories 16 to the latches 18 is twelve bits each and the load becomes twelve times.

Thus, a digital power supply for supplying power to the memories 16 and the latches 18 may vary using a data transfer start from the memories 16 to the latches 18 (MEM_EN) as a trigger. When the digital power supply varies, the ground (GND) may vary through a decoupling capacitor for reducing the variation. When the GND varies, voltage variation flows around to an analog power supply through the decoupling capacitor between the GND and the analog power supply, and the variation of the digital power supply is resultingly transmitted to the analog power supply.

Generally, the digital power supply and the analog power supply are separated in the imaging element 10 as another transmission route, and variation may be transmitted through parasitic capacitance in a supply process after separation. Thus, the variation generated by the digital processing, in other words, superimposing a noise component on the analog power supply causes the noise component to be superimposed on an output signal in an analog processing circuit receiving a voltage from the analog power supply and performing operation.

When noise is superimposed on an output signal from the analog processing circuit, a component different from that of image information read by the imaging element 10 is also transmitted to a post stage as the image information, and image quality is resultingly degraded.

A series of operation where the ADCs 14 read an analog signal held by the pixel units 12 and apply A/D conversion to the analog signal, and the memories 16 hold the A/D-converted analog signal is sequentially processed as soon as operation for one pixel is completed. In other words, processing independent of the data transfer operation to the latches 18 can be performed by a timing of executing the signal MEM_EN.

If a data transfer timing to the latches 18 is overlapped with a timing of A/D conversion by the ADCs 14 performing parallel processing, variation noise generated in a digital signal is mixed into an analog signal as described above. Noise (variation) of a digital signal by the data transfer from the memories 16 to the latches 18 converges at a certain time interval from the generation. However, as the example illustrated in FIG. 2, if analog signal processing (A/D conversion) of a next pixel starts before noise converges, noise is mixed into an analog signal and the signal is degraded.

Figure 3:
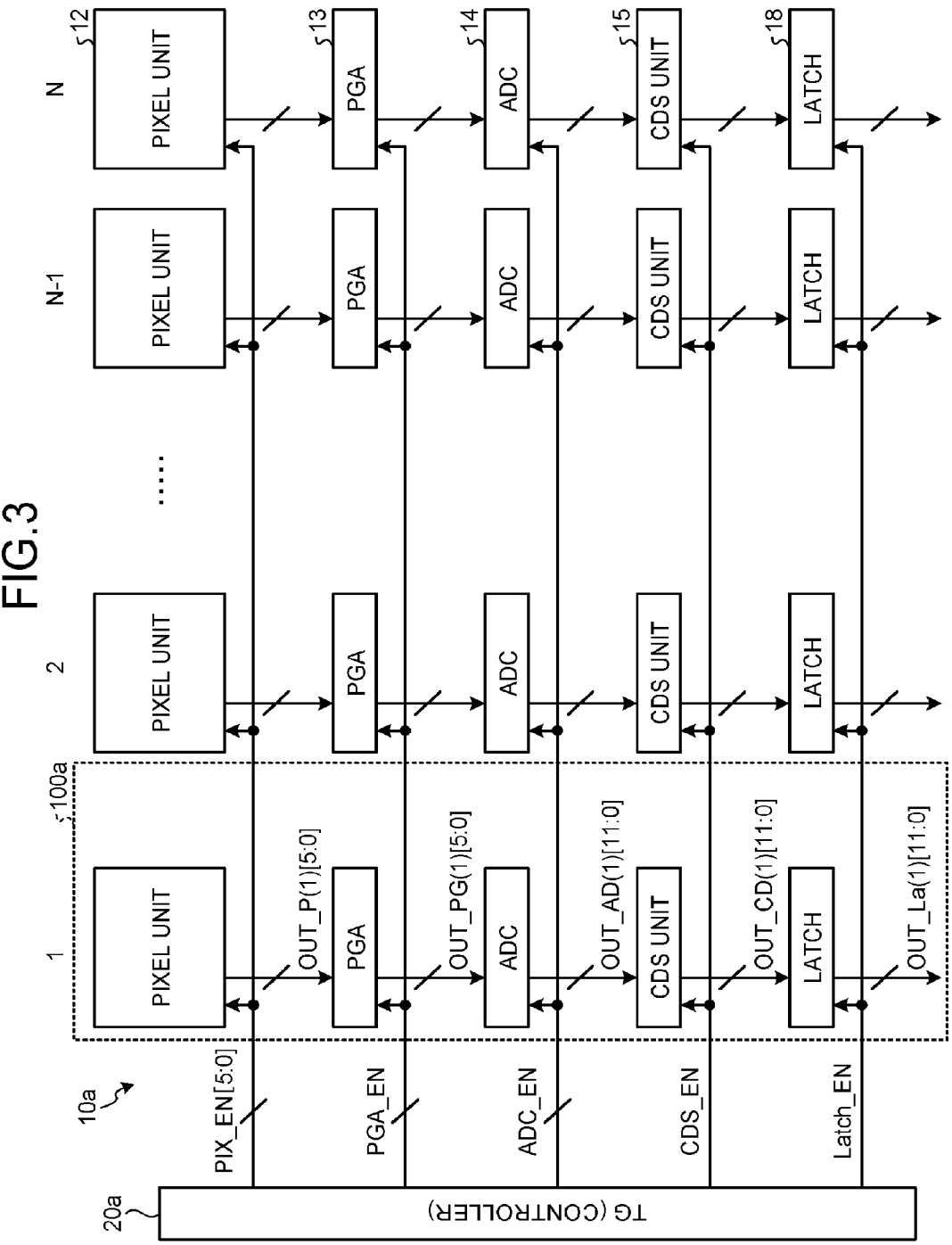
FIG. 3 is a view illustrating the outline of an imaging element in accordance with a second embodiment.

FIG. 3 is a view illustrating the outline of an imaging element 10a in accordance with a second embodiment. The imaging element 10a is a CMOS linear sensor that includes N each (for example, N=3,750) of the pixel units 12, programmable gain amplifiers (PGAs) 13, the ADCs 14, correlated double sampling (CDS) units 15, and the latches 18, and a timing controller (timing generator (TG)) 20a controlling the operation timing of the above-mentioned units. Like numerals refer to components substantially the same as the above-mentioned components.

Each of the PGAs 13 is an amplifier that sequentially amplifies an analog signal OUT_P[5:0] output by the pixel unit 12 depending on a dynamic range of the ADC 14 in the execution period of a signal PGA_EN input from the timing controller 20a. The PGAs 13 output an amplified analog signal as OUT_PG[5:0] to the ADCs 14.

Each of the CDS units 15 holds a digital signal indicating the reference level of the six light receiving elements included in the pixel unit 12 in darkness, and a digital signal indicating the signal level in receiving light in the execution period of a signal CDS_EN input from the timing controller 20a, and performs correlated double sampling (CDS) for each light receiving element. The CDS units 15 output a result obtained by the correlated double sampling as a plurality of digital signals OUT_CD[11:0] to the second holding units.

In this manner, the CDS units 15 have a function as the first holding units of sequentially holding a digital signal to which the ADCs 14 apply A/D conversion for each pixel unit 12. In addition, data is transferred from the CDS units 15 (first holding units) to the latches 18 (second holding units) at the execution timing of Latch_EN output by the timing controller 20a. In the imaging element 10a, each one of the pixel units 12, the PGAs 13, the ADCs 14, the CDS units 15, and the latches 18 forms one column 100a.

Figure 4:
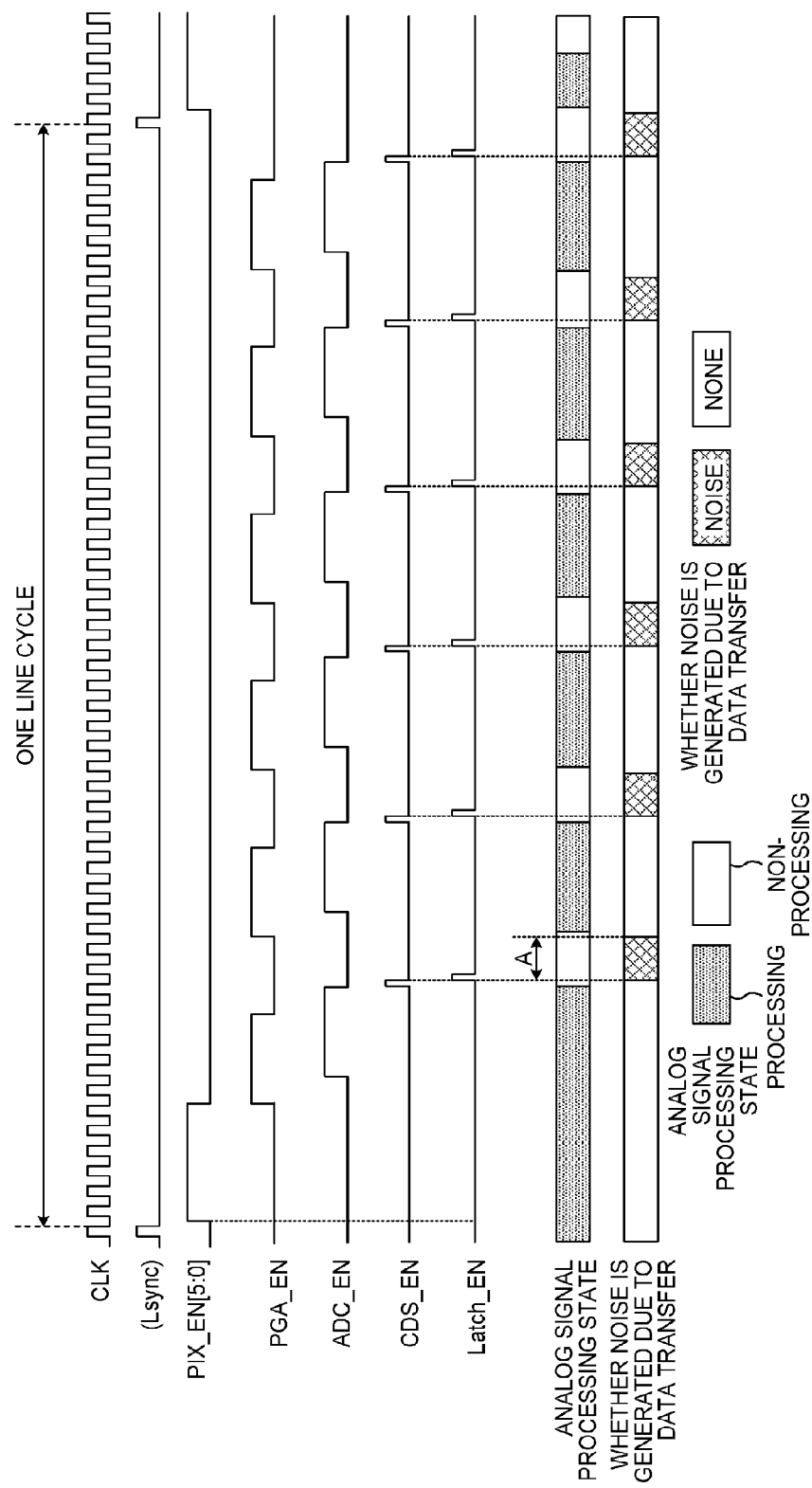
FIG. 4 is a timing chart illustrating a timing of a first operation performed by the imaging element illustrated in FIG. 3.

The following describes first operation of the imaging element 10a. FIG. 4 is a timing chart illustrating a timing of the first operation performed by the imaging element 10a illustrated in FIG. 3. In the first operation, the imaging element 10a performs operation ranging from the operation of the pixel units 12 to the operation of the ADCs 14 for each pixel (for each light receiving element in the pixel unit 12), and performs data transfer processing from the CDS units 15 to the latches 18 for each light receiving element.

The imaging element 10a separates a period of an analog signal processing state and a period when noise is generated due to data transfer for each light receiving element so as to prevent mixture of digital noise and perform analog signal processing (A/D conversion and the like).

More specifically, the imaging element 10a not only transfers data in a period when analog signal processing is not performed but also provides an A period until analog signal processing of a next light receiving element is started. In this A period, the imaging element 10a waits for digital noise generated by processing of transferring a previous pixel signal (digital signal) from the CDS units 15 to the latches 18 to converge, and prevents the noise by the digital signal processing from affecting analog signal processing of a next light receiving element.

Figure 5:
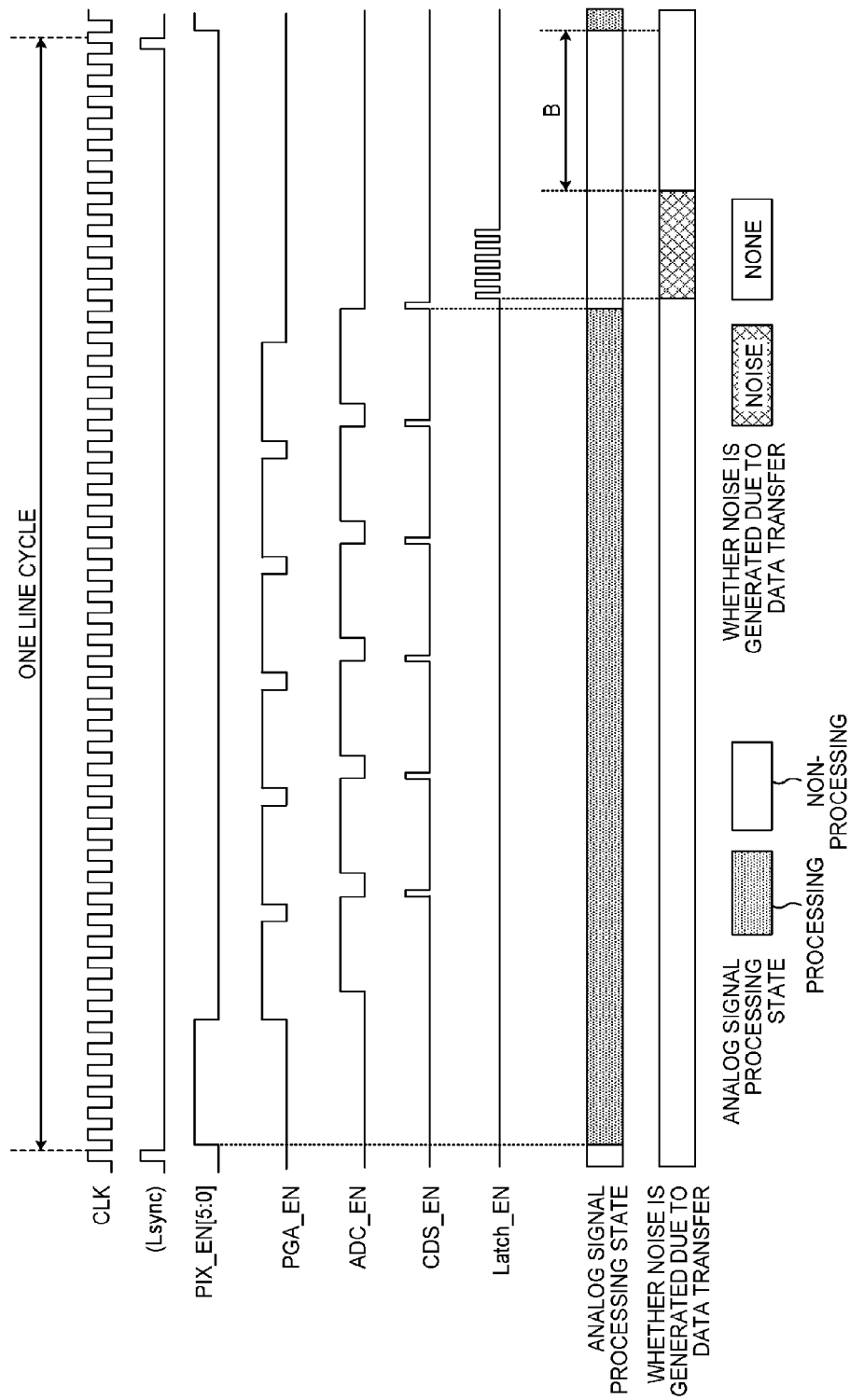
FIG. 5 is a timing chart illustrating a timing of a second operation performed by the imaging element illustrated in FIG. 3.

The following describes second operation of the imaging element 10a. FIG. 5 is a timing chart illustrating a timing of the second operation performed by the imaging element 10a illustrated in FIG. 3. In the second operation, the imaging element 10a performs operation ranging from the operation of the pixel unit 12 to the operation of the CDS unit 15 on all of the six pixels in the column 100a (all of the light receiving elements in the pixel unit 12), and sequentially performs data transfer processing from the CDS unit 15 to the latch 18 after completing the above-mentioned operation.

In this manner, the imaging element 10a can prevent mixture of digital noise that is generated by processing of transferring a previous pixel signal (digital signal) from the CDS units 15 to the latches 18 and successively perform analog signal processing (A/D conversion and the like) without waiting for the digital noise to converge. Furthermore, the imaging element 10a can successively and sequentially perform data transfer processing from the CDS units 15 to the latches 18 so as to shorten a noise generation period.

After the imaging element 10a reads an image for one line, a margin period (B period in FIG. 5) is generated before the imaging element 10a starts reading an image for a next line. The imaging element 10a can perform operation in a shorter line cycle by reducing the margin period. In other words, noise by digital signal processing is prevented from being generated in an analog processing period in one line without sacrificing high-speed operation.

Figure 6:
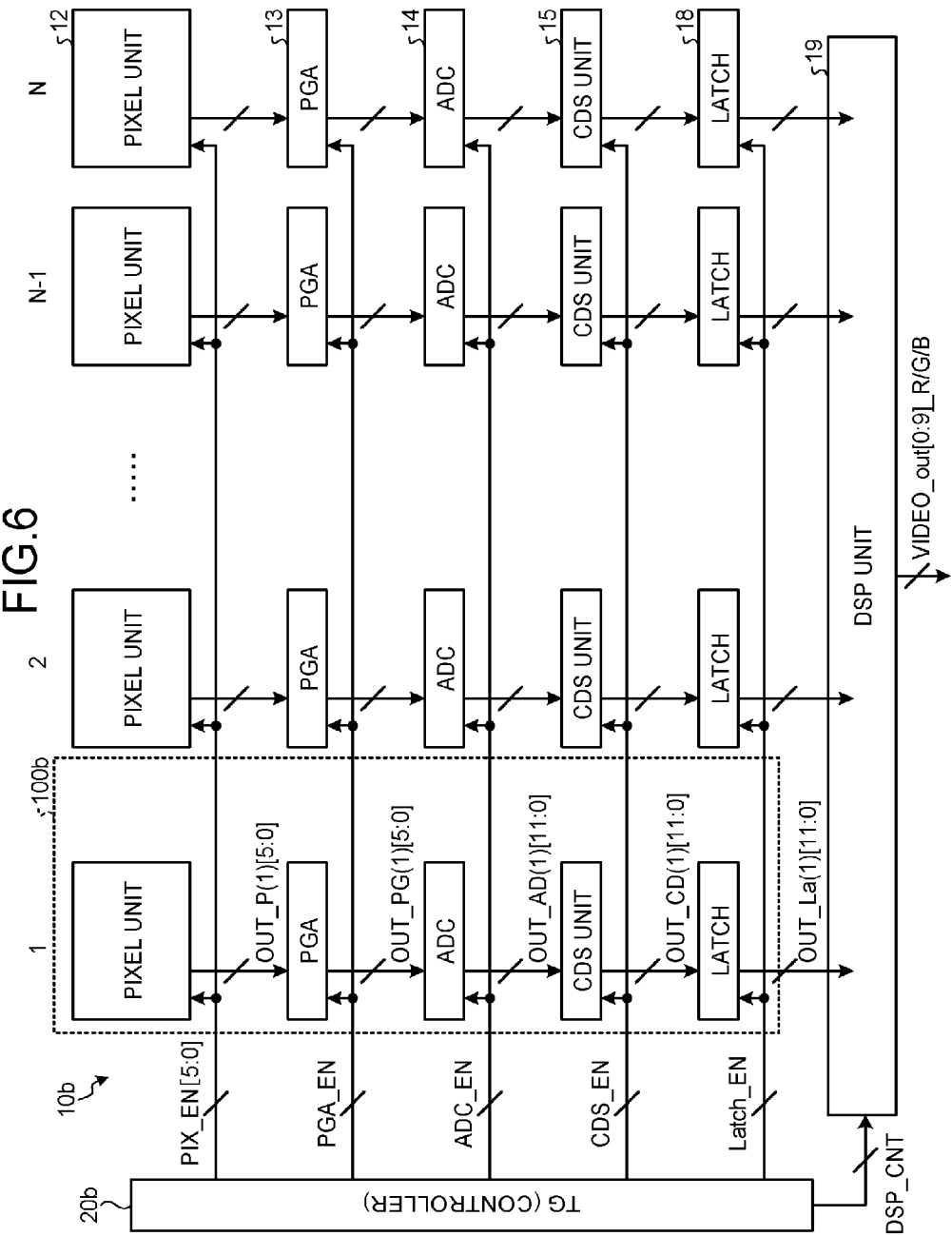
FIG. 6 is a view illustrating the outline of an imaging element in accordance with a third embodiment.

FIG. 6 is a view illustrating the outline of an imaging element 10b in accordance with a third embodiment. The imaging element 10b is a CMOS linear sensor that includes N each (for example, N=3,750) of the pixel units 12, the PGAs 13, the ADCs 14, the CDS units 15, and the latches 18, a digital signal processing (DSP) unit 19 performing digital signal processing, and a timing controller (timing generator (TG)) 20b controlling the operation timing of the above-mentioned units. In the imaging element 10b, each one of the pixel units 12, the PGAs 13, the ADCs 14, the CDS units 15, and the latches 18 forms one column 100b.

For example, the DSP unit 19 has digital signal processing functions such as a function of converting parallel signals output by the latches 18 to serial signals, a function of outputting only a signal of a certain pixel in an image signal read by the imaging element 10b to a post stage, a function of amplifying an image signal, and a function of converting an image signal to a low voltage differential signaling (LVDS) signal in order to output the image signal to the outside. The DSP unit 19 performs operation depending on a signal DSP_CNT input from the timing controller 20b.

Figure 7:
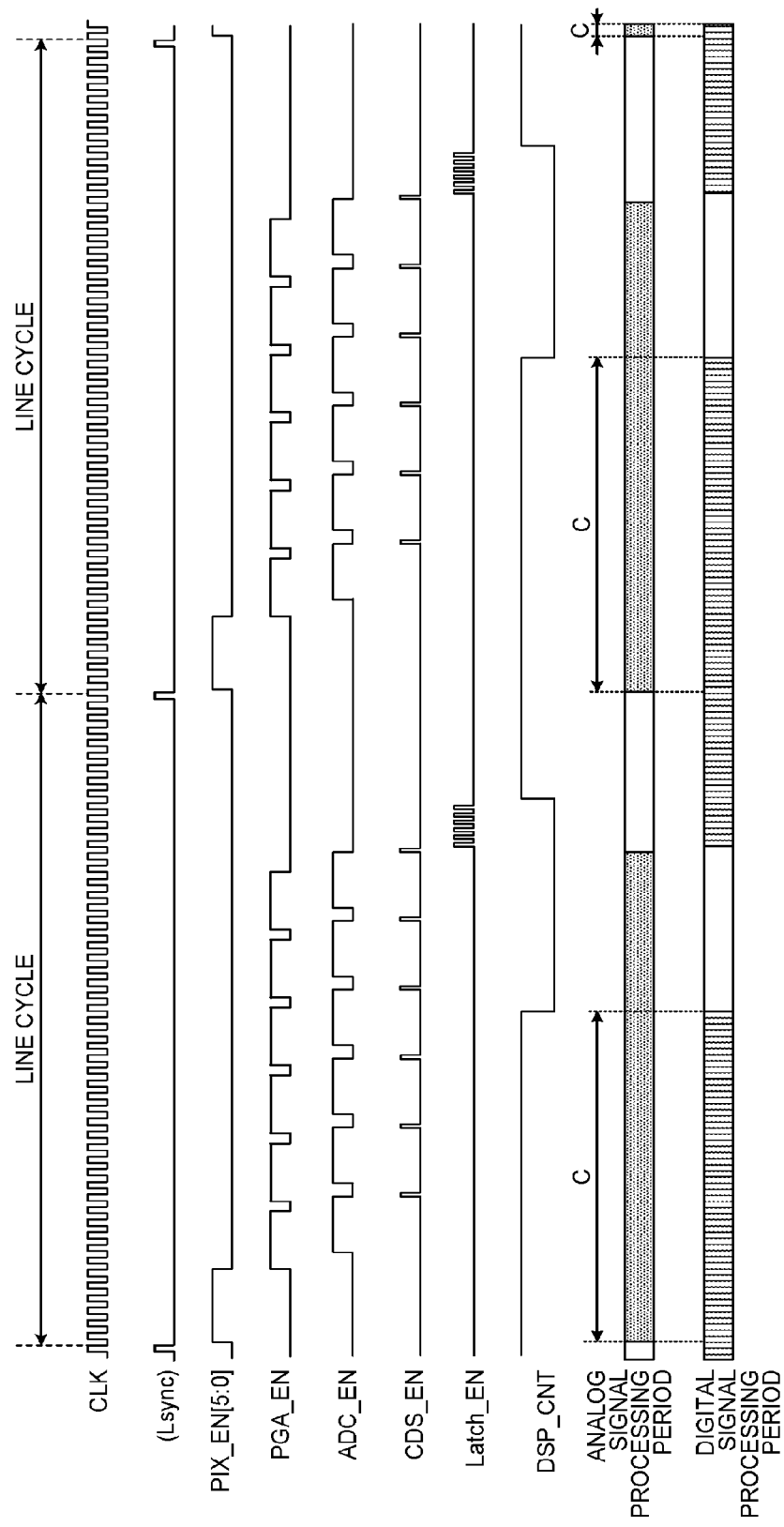
FIG. 7 is a timing chart illustrating an operation example as a comparative example of the imaging element.

FIG. 7 is a timing chart illustrating an operation example as a comparative example of the imaging element 10b. As described above, the DSP unit 19 performs digital signal processing on image data (digital signal) output by the latches 18 depending on DSP_CNT input from the timing controller 20b.

For example, the DSP unit 19 converts parallel image data output by each of the latches 18 to serial image data. The DSP unit 19 may subtract, in optically light-shielded/non-light-shielded pixel data out of the pixel data of the same line, the light-shielded data from the non-light-shielded data. In addition, the DSP unit 19 performs processing such as processing of amplifying image data with digital gain integration, processing of applying a predetermined offset level to the amplified image data, and processing of converting image data and a line synchronization signal to parallel data and outputting the parallel data as an LVDS signal.

The operation of the imaging element 10b illustrated in FIG. 7 indicates that, in an analog signal processing period and digital signal processing after processing performed by the CDS units 15, a digital signal processing period of a pixel on the n-th line is overlapped with an analog signal processing period of a pixel on the (n+1)-th line (C period).

Pixels of the imaging element 10b are formed of test pixels, optically light-shielded pixels, effective pixels, and ineffective pixels. Periods indicated as digital signal processing periods in FIG. 7 are digital processing periods for image data of effective pixels out of the document images read by the imaging element 10b, and digital signal processing is performed during approximately one line period for processing of pixels other than the effective pixels. In FIG. 7, periods other than the digital signal processing periods (periods having no vertical lines) are periods when processing necessary for image data is completed and digital signal processing is stopped, and no digital noise is generated. Thus, digital noise in this period is not superimposed on an analog signal. The digital signal processing periods illustrated in FIG. 7 include periods when the latches 18 perform operation and periods when the DSP unit 19 performs operation.

Figure 8:
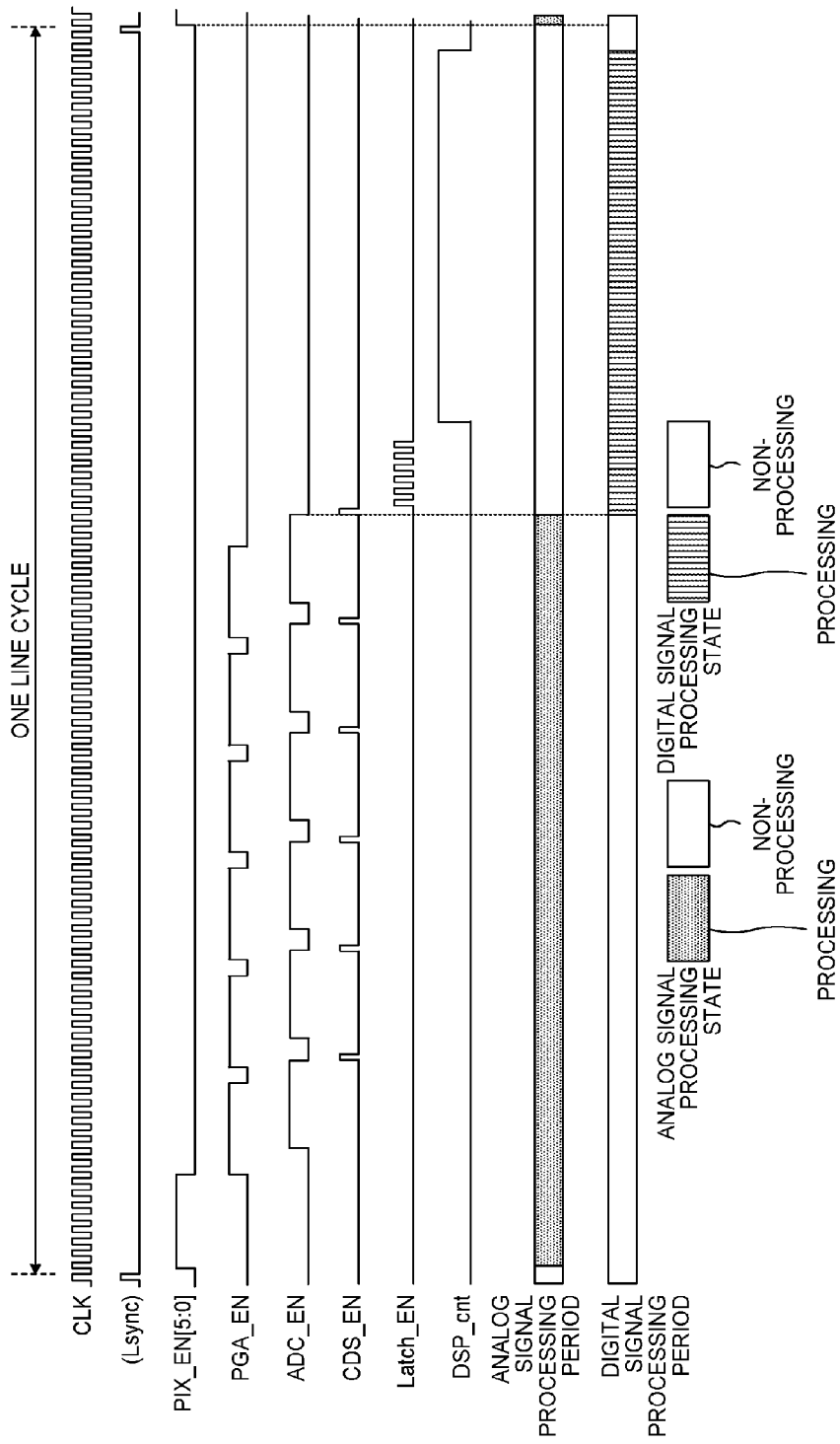
FIG. 8 is a timing chart illustrating an operation timing of the imaging element illustrated in FIG. 6.

FIG. 8 is a timing chart illustrating an operation timing of the imaging element 10b illustrated in FIG. 6. The imaging element 10b starts digital signal processing after a processing period of all analog signals is completed. In other words, the imaging element 10b completely separates an analog signal processing period and a digital signal processing period so as to prevent noise due to a digital signal from being mixed into an analog signal. In this manner, even when noise due to digital processing other than data transfer is generated in the DSP unit 19 and the like, the imaging element 10b completely separates an analog signal processing period and a digital signal processing period so as to prevent noise due to a digital signal from being mixed into an analog signal.

Figure 9:
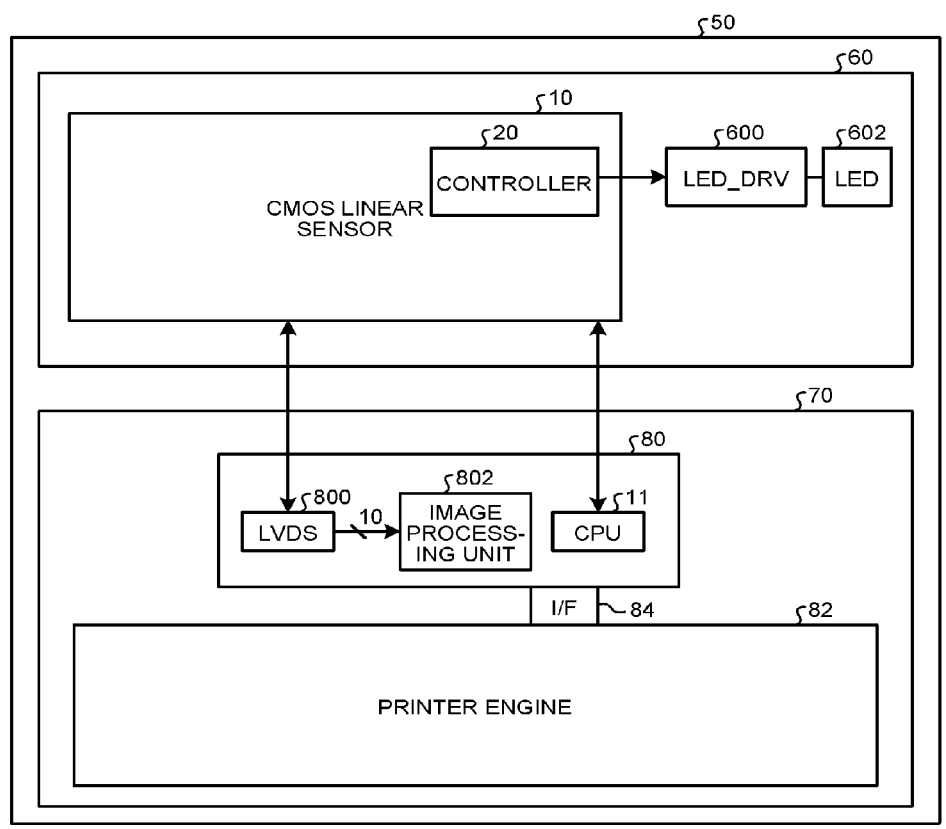
FIG. 9 is a view illustrating the outline of an image forming apparatus that is provided with an image reading device including the imaging element.

The following describes an image reading device and an image forming apparatus that include the imaging element 10 (the imaging element 10a or the imaging element 10b). FIG. 9 is a view illustrating the outline of an image forming apparatus 50 that is provided with an image reading device 60 including the imaging element 10 (the imaging element 10a or the imaging element 10b). Examples of the image forming apparatus 50 include a copier and a multifunction peripheral (MFP) that includes the image reading device 60 and an image forming unit 70.

The image reading device 60 includes, for example, the imaging element 10, a light-emitting diode (LED) driver (LED_DRV) 600, and an LED 602. The LED driver 600 is synchronized with, for example, a line synchronization signal output by the timing controller (controller) 20 so as to drive the LED 602. The LED 602 irradiates a document with light. The imaging element 10 is synchronized with a line synchronization signal and the like and receives reflected light from a document, and the light receiving elements generate electric charge so as to store therein the electric charge. The imaging element 10 performs parallel-serial conversion and the like, and after that, outputs image data to the image forming unit 70.

The image forming unit 70 includes a processing unit 80 and a printer engine 82, and the processing unit 80 and the printer engine 82 are connected to each other through an interface (I/F) 84.

The processing unit 80 includes an LVDS 800, an image processing unit 802, and a central processing unit (CPU) 11. The CPU 11 executes a computer program stored in a memory and the like, and controls each of the units forming the image forming apparatus 50 such as the imaging element 10.

The imaging element 10 outputs, for example, image data of an image read by the image reading device 60, a line synchronization signal, and a transmission clock to the LVDS 800. The LVDS 800 converts the received image data, line synchronization signal, transmission clock, and the like to parallel 10-bit data. The image processing unit 802 performs image processing using the converted 10-bit data, and outputs image data and the like to the printer engine 82. The printer engine 82 performs printing using the received image data.

According to the present invention, noise generated in a digital signal at a timing other than the timing when a signal is output to an external unit at a post stage can be prevented from being mixed into an analog signal.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An imaging element comprising:
   a plurality of pixel units each including a plurality of light receiving elements for performing photoelectric conversion, the pixel units being arranged in at least one line;

a plurality of analog-to-digital (A/D) converters provided corresponding to the pixel units, respectively, each A/D converter being configured to sequentially convert analog signals obtained by photoelectric conversion performed by the light receiving elements in the corresponding pixel unit to digital signals during a scan period for the one line;

a plurality of first holding units provided corresponding to the pixel units, respectively, each first holding unit being configured to sequentially hold the digital signals obtained by conversion performed by the corresponding A/D converter during the same scan period; and a plurality of second holding units configured to receive and hold the digital signals held by the first holding units, respectively, in a period when the A/D converters do not perform the conversion during the same scan period.

2. The imaging element according to claim 1, wherein, after each of the A/D converters performs the conversion for the corresponding pixel unit, the corresponding second holding unit receives and holds the digital signals held by the corresponding first holding unit.

3. The imaging element according to claim 1, further comprising:
a controller configured to, after each of the A/D converters performs the conversion, transfer the digital signals held by the corresponding first holding unit to the corresponding second holding unit.

4. The imaging element according to claim 1, wherein each of the first holding units holds a digital signal indicating a reference level of the light receiving elements included in the corresponding pixel unit in darkness, and a digital signal indicating a signal level in receiving light, and outputs a result obtained by correlated double sampling that is applied to each light receiving element as a plurality of digital signals held by the corresponding first holding unit to the corresponding second holding unit.

5. The imaging element according to claim 1, further comprising:
a plurality of amplifiers configured to amplify the analog signals output by the pixel units, respectively, wherein
each of the A/D converters sequentially hold converts the amplified analog signal obtained by the corresponding amplifier.

6. The imaging element according to claim 1, further comprising:
a digital signal processing unit configured to process the digital signals held by the second holding units, wherein
each of the pixel units performs next photoelectric conversion after the digital signal processing unit processes the digital signals held by the corresponding second holding unit, and
each of the A/D converters performs next conversion after the digital signal processing unit processes the digital signals held by the corresponding second holding unit.

7. An image reading device, comprising:
the imaging element of claim 1.

8. An image forming apparatus comprising:
the image reading device of claim 7; and
an image forming unit that forms an image based on image data read by the image reading device.

9. An imaging method comprising:
sequentially converting analog signals obtained by photoelectric conversion performed by a plurality of light receiving elements included in each of a plurality of pixel groups to digital signals during a scan period for one line, the pixel groups being arranged in at least the one line;

sequentially holding the converted digital signals in each of a plurality of memories corresponding to the respective pixel groups during the same scan period; and transferring, after the analog signals are converted to the digital signals for each pixel group, the digital signals held by the corresponding memory to corresponding one of a plurality of latches during the same scan period.

10. An imaging element comprising:
a plurality of pixel groups each including a plurality of light receiving elements for performing photoelectric conversion, the pixel groups being arranged in at least one line;

a plurality of analog-to-digital (A/D) converters provided corresponding to the pixel groups, respectively, each A/D converter being configured to sequentially convert analog signals obtained by photoelectric conversion performed by the light receiving elements in the corresponding pixel group to digital signals during a scan period for the one line;

a plurality of memories provided corresponding to the pixel groups, respectively, each memory being configured to sequentially hold the digital signals obtained by conversion performed by the corresponding A/D converter during the same scan period; and a plurality of latches configured to receive and hold the digital signals held by the memories, respectively, in a period when the A/D converters do not perform the conversion during the same scan period.

11. The imaging element according to claim 10, wherein, after each of the A/D converters performs the conversion for the corresponding pixel group, the corresponding latch receives and holds the digital signals held by the corresponding memory.

12. The imaging element according to claim 10, further comprising:
circuitry configured to, after each of the A/D converters performs the conversion, transfer the digital signals held by the corresponding memory to the corresponding latch.

13. The imaging element according to claim 10, wherein each of the memories holds a digital signal indicating a reference level of the light receiving elements included in the corresponding pixel group in darkness, and a digital signal indicating a signal level in receiving light, and outputs a result obtained by correlated double sampling that is applied to each light receiving element as a plurality of digital signals held by the corresponding memory to the corresponding latch.

14. The imaging element according to claim 10, further comprising:
circuitry configured to process the digital signals held by the latches, wherein
each of the pixel groups performs next photoelectric conversion after the circuitry processes the digital signals held by the corresponding latch, and
each of the A/D converters performs next conversion after the circuitry processes the digital signals held by the corresponding latch.

* * * * *